United States Patent Office 2,972,687
Patented Feb. 21, 1961

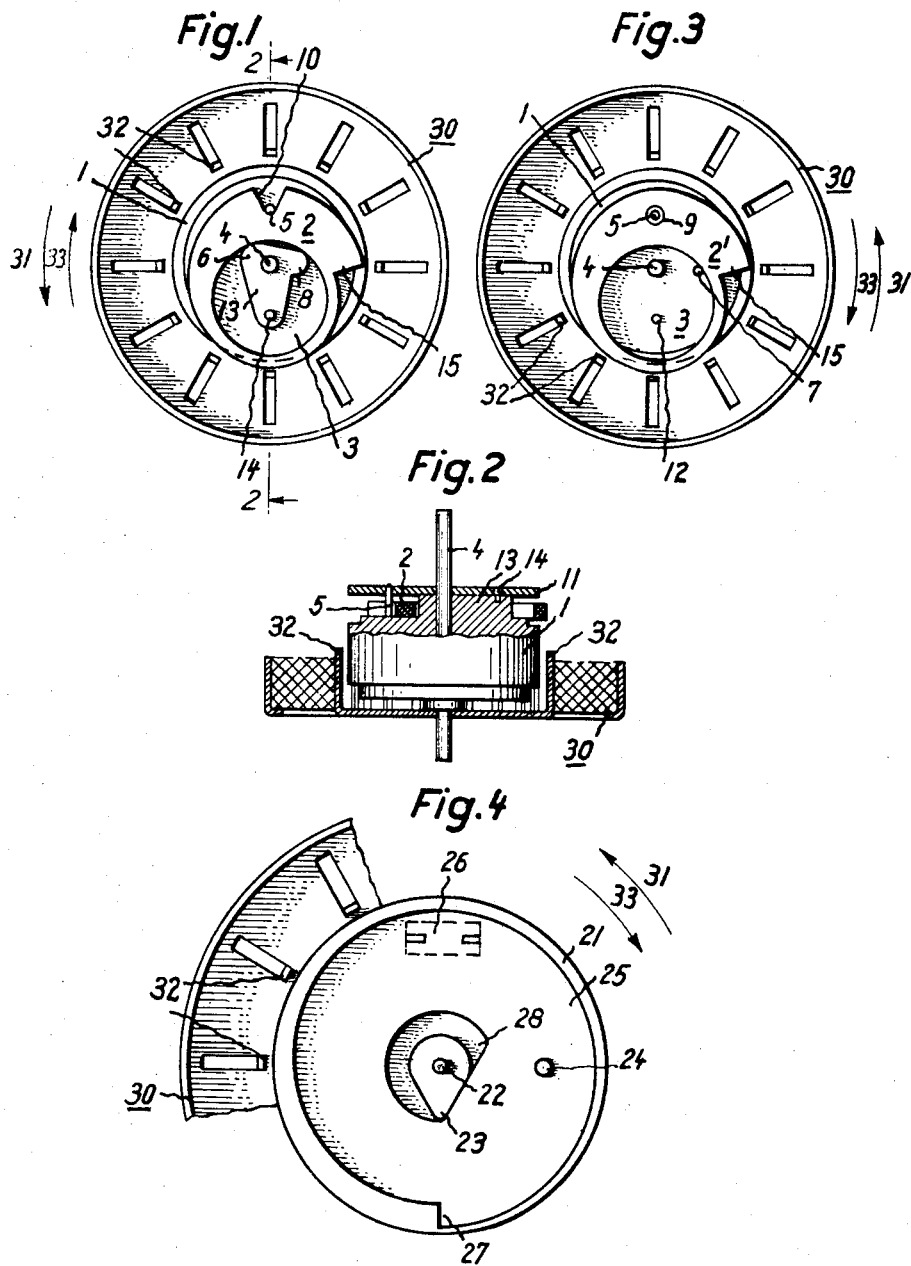

2,972,687

DIRECTIONAL CONTROL FOR SYNCHRONOUS MOTORS

Hans Köhler, Berlin-Schmargendorf, Germany, assignor to Licentia Patent-Verwaltungs-G.m.b.H., Hamburg, Germany Filed Jan. 10, 1958, Ser. No. 708,320

Claims priority, application Germany Jan. 14, 1957

17 Claims. (Cl. 310—41)

The present invention relates to synchronous motors of small size used for driving clocks, switch mechanisms in electric meters, time switches and similar apparatus. More particularly, the invention relates to synchronous motors of the self-starting type.

It is an object of the invention to improve the self-starting operation of such synchronous motors, i.e., to assure that the rotors of these motors always start to run in the desired or predetermined direction.

It is another object of the invention to provide synchronous motors with ratchet or blocking mechanisms to prevent the rotors from starting in the wrong direction.

It is a further object of the invention to provide a blocking means excentrically positioned with respect to the rotor of a synchronous motor, said blocking means being adapted to engage the stator of this motor if the rotor should start to run in the wrong direction.

It is still another object of the present invention to provide as blocking means for the rotor of such small synchronous motor a disk or plate of resilient or elastic material having a diameter slightly smaller than that of the stator. This disk is pivotally mounted on a pin secured to the rotor and disposed parallel with respect to the axis of rotation of the rotor and excentrically with respect to the rotor shaft, in such a manner that the rim of the disk at the side opposite the pivot pin engages the stator pole pieces of the motor.

As a result of this, the elastic disk slightly engages the inner periphery of the stator and moves past the stator pole pieces almost without friction, if the rotor is running in the proper direction.

It is also possible to provide the elastic disk in such a way that it will clear the stator or its poles, when the rotor is running in the predetermined or proper direction. If, however, the rotor starts to rotate in the opposite, i.e. undesired, direction, the disk is pressed against the stator pole pieces and thereby becomes jammed. It is advantageous to provide in the disk a circular cutout excentrically disposed with respect to the periphery of the disk, whereby the disk assumes the shape of a ring of a continuously varying wall thickness. The opening for the pivot pin is provided in the portion of the ring of larger thickness. Due to this construction of the ring-shaped disk its elasticity is considerably increased.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Fig. 1 is a front view of a rotor of a synchronous motor provided with a blocking means according to this invention, a retaining plate for this blocking means being removed so as to show the inner structure of the blocking means.

Fig. 2 is a side view partly in section of the motor shown in Fig. 1, said section taken along the line 2—2 of Fig. 1.

Fig. 3 shows a front view of such synchronous motor with a modified blocking means according to the invention, the retaining plate being also removed.

Fig. 4 shows a front view of another embodiment of the motor according to this invention, the retaining plate being also removed.

In Fig. 1 of the drawings, a rotor 1 secured to a shaft 4 is rotatably mounted in a stator 30 of a small self-starting synchronous motor. A disk or ring 2 having the approximate size of the diameter of the rotor 1 and being made of elastic or resilient material is loosely seated on a hub-like member 13 of the rotor 1 at one side thereof, whereby this disk or ring is surrounded by the pole pieces of the stator 30. The ring 2 has a circular opening 3 eccentrically disposed with respect to the periphery of the ring, so that the width of the ring changes from a larger to a smaller size. A pin 5 is attached to the same side of the rotor 1 and is disposed parallel with respect to the shaft 4. The rim of the ring 2 at its widest section, i.e. diametrically opposite said opening 3, is provided with a conically widening cutout 10 forming a bearing for the pin 5. Thus the ring 2 is adapted to swing about this pin 5, whereby the swinging movements are limited by the hub-like member 13 which is secured to or integral with that side of the rotor 1, on which the ring 2 is seated, said hub-like member extending into the ring opening 3 (see Fig. 2). The member 13 has the general shape of a triangle with rounded corners, of which rounded corner 6 forms one abutment for the inner periphery of the opening 3, while a dog-like protrusion 8 extending and replacing a second rounded corner of this triangle serves as the second abutment for the inner periphery of the opening 3. Thus the extent of the swinging movement of the ring 2, which rotates together with the rotor 1, is controlled by the two abutments 6 and 8. The ring 2 has at one side of its periphery about halfway between its widest and narrowest sections a cutout forming a pawl 15, the function of which will be explained below. A retaining plate 11 is mounted on the hub-like member 13, for example, by riveting, with the aid of a rivet bolt at 14 secured to this hub and passed through the plate 11 (Fig. 2). In addition to this, the free end of the pin 5 is passed through the plate 11 and suitably attached thereto likewise by riveting. The retaining plate 11, which is preferably circular, prevents the ring 2 from dropping off the pin 5 and the hub-like member 13.

In the example illustrated, the desired direction of rotation of the rotor 1 is assumed to be counterclockwise, as indicated by arrow 31. When the rotor 1 rotates in this, i.e. the proper direction, the opening 3 of the ring 2 will be pressed on the dog-like abutment 8 under the action of the centrifugal force to which the ring 2 is then subjected due to its rotation with the rotor 1. The outer periphery of the ring 2 at its narrowest portion will slide on and along the inner periphery of the stator pole pieces 32 with extremely little friction and pressure, so that the ring 2 will not be deformed. However, if the rotor 1 should start to run in the opposite direction indicated by arrow 33, the thin-walled section of the ring 2 will be slightly deformed so that its rim will press against the inner periphery of the stator pole pieces 32 with a blocking force and the pawl 15 will engage a flank of one of the stator pole pieces with the result that the rotation of the rotor in the undesired direction is interrupted, whereupon the rotor will immediately start to run in the opposite, i.e. the desired or predetermined direction.

In the embodiment of the invention, shown in Fig. 3, the rotor 1, its shaft 4, pin 5 and stator 30 with its pole pieces 32 are the same as in Figs. 1 and 2 and therefore bear the same reference numbers.

While in Figs. 1 and 2, the rim of the ring 2 has a cutout 10 forming a bearing for the pin 5, in the modified embodiment of Fig. 3, a ring 2' is provided with a bore 9, at the place of the bearing formed by the cutout 10 in Figs. 1 and 2. The pin 5 in Fig. 3 passes through this bore 9. Otherwise the ring 2' has the same shape as the ring 2 in Figs. 1 and 2, i.e. is provided with a circular opening 3 and a panel 15. In place of the hub-like member 13 of Figs. 1 and 2, the rotor 1 in Fig. 3 is provided with an abutment pin 7 which is parallel to the shaft 4 of this rotor and disposed at the point of the abutment provided by the dog-like protrusion 8 in Fig. 1. The rotor shaft 4 serves as second abutment for the ring opening 3, i.e. takes the place of the rounded corner 6 in Fig. 1. A fixing bolt 12 directly secured to the rotor 1 and the pivoting pin 5 are adapted to be passed through the retaining plate 11 and riveted thereto in the same way as in Fig. 2 the bolt at 14 and the pin 5.

The function of the blocking mechanism, i.e. the ring 2' in Fig. 3, is the same as that of the ring 2 in Figs. 1 and 2. This ring 2' when rotating with the rotor 1 is swinging about the pin 5 which is passed through the bore 9 in the ring 2', whereby the swinging movement is limited by the abutment pin 7 engaging the periphery of the opening 3 at one side and by the rotor shaft 4 engaging this periphery at the other side. The ring 2' acts in the same way as the ring 2 in Figs. 1 and 2 when the rotor 1 rotates in the desired or in the undesired directions, respectively.

Fig. 4 illustrates an embodiment of the invention, in which a ring-shaped flat blocking disk 25, similar to that in the foregoing examples, is provided in such a manner that it will not engage the inner periphery of the pole pieces 32 of the stator 30, when the synchronous motor is running in the predetermined direction.

A rotor 21 of this motor is mounted on a shaft 22. The flat blocking member or disk 25, suitably made of plastic material, is loosely seated at one of the sides of rotor 21, said disk 25 being provided with a pawl 27, which is similar to the pawl 15 in the foregoing embodiments. The disk 25 is pivotally mounted on a pin 24 secured to or partially embedded in the rotor 21 and being parallel with respect to the axis of the rotor shaft 22. This pin 24 serves the same purpose as the pivoting pin 5 in Fig. 3. The swinging movement of the disk 25 about the pin 24 is limited by cooperation of a cam-shaped protrusion 23 attached to the side of the rotor 21 with a cutout 28 in the center of this disk, i.e. the protrusion 23, which may be integral with the rotor 21, extends into the cutout. This cam-shaped protrusion 23 has a form similar to that of a sector of a circle, while the cutout 28 has the shape of an incomplete, i.e. a three-quarter circle, the remaining portion being formed by a straight line.

In the example shown in Fig. 4, the disk 25 is in its end position which it assumes when the rotor is running in the proper, i.e. counterclockwise, direction indicated by arrow 31. The disk 25 is held in this position under the action of the cam-shaped protrusion 23, whereby the pawl 27 is retained within the contour of the rotor 21 and no part of the disk 25 can engage the stator 30 or its pole pieces 32. A weight in the form of a clip 26 is attached to the disk 25 approximately diametrically opposite the pawl 27 and displaced about 90° with respect to the pivot at 24. This clip 26, suitably made of non-magnetizable material, such as brass or copper, increases the forces of inertia of the disk 25. The clip 26 is mounted on the disk 25 by means of bent tabs integral with the clip and passed through holes in the disk. If the rotor 21 should start to run in the undesired, i.e. clockwise direction, indicated by arrow 33, the inertia forces, i.e. the moment of inertia of the disk 25, increased by the out-of-balance weight or clip 26 will dominate over the centrifugal force acting on the disk, with the result that this disk 25 will turn or swing counterclockwise about the pivot pin 24. The pawl 27 will then be caused to project beyond the contour of the rotor 21 and will engage one of the pole pieces 32 of the stator 30 in the same manner as the pawl 15 in the foregoing embodiments. If, however, the rotor 21 starts to run in the proper direction indicated by arrow 31, the inertia force and the centrifugal force of the clip 26 will assist one another and will act together on the disk 25 in such a manner that this disk 25 turns clockwise about the pivot pin 24 until the straight part of the cutout 28 in the disk will be seated on a straight part of the cam 23 (see Fig. 4) whereby pawl 27 is withdrawn from the stator 30 so that the rotor 21 can run freely. A retaining plate for the disk 25, such as plate 11 in Fig. 2, has to be provided and secured to the rotor in a similar manner as in Fig. 2.

I claim:

1. A synchronous motor comprising a stator, a rotor rotatably mounted in said stator, a blocking means, a pivot excentrically secured to one side of said rotor, said blocking means being pivotally mounted on said pivot to swing freely about the same, control means on said rotor adapted to permit said blocking means to press against the inner periphery of said stator to stop the rotation of said rotor if the latter should start to run in the undesired direction.

2. A synchronous motor according to claim 1, wherein said blocking means is provided with a pawl adapted to engage said inner periphery of said stator, when said rotor starts to run in the undesired direction.

3. A synchronous motor according to claim 1, wherein said stator has pole pieces on said inner periphery to be engaged by said blocking means, when said rotor is running in the undesired direction.

4. A synchronous motor according to claim 1, wherein said blocking means is a disk of elastic material having a diameter slightly smaller than that of said inner periphery of said stator and having an opening, said control means extending into said opening and being adapted to press against the inner wall thereof, when said rotor starts to run in the undesired direction, in such a way that said elastic disk is distorted to press a part of its rim against said inner periphery of said stator to stop rotation of said rotor.

5. A synchronous motor according to claim 4, wherein said disk is mounted on said pivot and controlled by said control means in such a way that, during the rotation of said rotor in the desired direction, that peripheral rim portion of said disk, which is opposite said pivot, engages the inner periphery of said stator with so little friction that the rotation of said rotor will not be impaired.

6. A synchronous motor according to claim 4, wherein said opening is excentrically disposed in said disk which thereby assumes the shape of a ring of continuously varying wall width, wherein said disk has a bearing seating on said pivot pin, said bearing being in the part of largest width of said disk.

7. A synchronous motor according to claim 6, wherein said bearing is formed by the end of a conically enlarging slot in the rim of the part of largest width of said disk.

8. A synchronous motor according to claim 4, wherein said control means comprises an abutment pin on the same side of said rotor as said pivot and being parallel thereto, said abutment pin being adapted to be engaged by said inner wall of said opening to limit the swinging movement of said disk.

9. A synchronous motor according to claim 4, wherein said control means comprises a hub-like member on the same side of said rotor as said pivot pin, said member having two cam-shaped abutments being adapted to be engaged by said inner wall of said opening to limit the swinging movements of said disk.

10. A synchronous motor according to claim 1, wherein said blocking means is a disk having a diameter smaller than that of said inner periphery of said stator, said control means extending into said opening and being adapted to be applied to the inner wall thereof, an out-of-balance weight secured to said disk at such position with respect to said pivot that said disk is swung under the action of the centrifugal and the inertia forces about said pivot so as to engage with its rim said inner periphery of said stator, when said rotor starts to run in the undesired direction, whereby the rotation of said rotor is blocked, while said disk is swung about said pivot in the reverse swinging direction to be entirely withdrawn from said inner periphery of said stator, when said rotor starts to run in the desired direction, whereby said withdrawn position of said disk is controlled by the engagement of said control means with said inner wall of said opening.

11. A synchronous motor according to claim 10, wherein said disk is made of plastic material.

12. A synchronous motor according to claim 1, wherein a retaining plate for said blocking means is provided at the outer side of said blocking means and is secured to said rotor at the same side as said pivot.

13. A synchronous motor according to claim 12, wherein said pivot is a bolt passed through said retaining plate and riveted thereto.

14. A synchronous motor according to claim 13, wherein an additional fixing bolt is secured to said side of said rotor and is passed through said retaining plate and is riveted thereto.

15. A synchronous motor according to claim 12, wherein said blocking disk is provided with an additional weight, said weight, being of non-magnetic material and located excentrically with respect to the rotor shaft, serving to augment the active inertia forces of the device.

16. A synchronous motor according to claim 15, wherein said blocking disk has a pawl adapted to engage with the stator, said pawl being displaced by 180 degrees with respect to said additional weight, and that the line connecting said pawl to said pivot runs at a right angle with respect to the line connecting said weight to said pivot.

17. A synchronous motor according to claim 12 that said weight is designed as a metal clip punched upon said disk.

No references cited.